United States Patent
Li et al.

(10) Patent No.: US 10,278,182 B2
(45) Date of Patent: Apr. 30, 2019

(54) CHANNEL SELECTION METHOD AND TRANSMIT END

(71) Applicant: Huawei Technologies Co., Ltd., Shenzhen (CN)

(72) Inventors: Yanchun Li, Shenzhen (CN); Bo Li, Xi'an (CN); Qiao Qu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/446,871

(22) Filed: Mar. 1, 2017

(65) Prior Publication Data

US 2017/0188364 A1    Jun. 29, 2017

Related U.S. Application Data

(63) Continuation of application No. PCT/CN2014/085675, filed on Sep. 1, 2014.

(51) Int. Cl.
*H04W 16/10* (2009.01)
*H04W 24/02* (2009.01)
(Continued)

(52) U.S. Cl.
CPC ....... *H04W 72/0453* (2013.01); *H04W 16/10* (2013.01); *H04W 24/02* (2013.01);
(Continued)

(58) Field of Classification Search
CPC ............. H04W 72/0453; H04W 24/02; H04W 40/005; H04W 72/06
See application file for complete search history.

(56) References Cited

U.S. PATENT DOCUMENTS 5,832,384 A * 11/1998 Balachandran ....... H04W 16/14
                                                      455/450
9,648,613 B2 * 5/2017 Choi ...................... H04W 4/70
(Continued)

FOREIGN PATENT DOCUMENTS

CN          102438313 A      5/2012
CN          102740475 A     10/2012
(Continued)

OTHER PUBLICATIONS

Tan et al., "Fine-grained Channel Access in Wireless LAN," SIGCOMM'10, ACM, (Aug. 30-Sep. 3, 2010).
(Continued)

*Primary Examiner* — Qun Shen
(74) *Attorney, Agent, or Firm* — Leydig, Voit & Mayer, Ltd.

(57) ABSTRACT

Embodiments provide a channel selection method and a transmit end, and the method includes: ranking multiple channels, and generating a backoff count value; sequentially decrementing, from an initial timeslot, the backoff count value in each timeslot according to a ranking sequence of the channels and busy/idle states of all the channels until the backoff count value is 0; and selecting, from the multiple channels according to a result of the decrement performed on the backoff count value and a busy/idle state of at least one of the multiple channels, a channel that is used by the transmit end for sending data. The method and the transmit end can improve channel utilization.

16 Claims, 6 Drawing Sheets

(51) Int. Cl.
*H04W 72/04* (2009.01)
*H04W 40/00* (2009.01)
*H04W 72/06* (2009.01)
*H04W 74/08* (2009.01)

(52) U.S. Cl.
CPC ......... *H04W 40/005* (2013.01); *H04W 72/06* (2013.01); *H04W 74/0808* (2013.01)

(56) References Cited

U.S. PATENT DOCUMENTS

| | | | | |
|---|---|---|---|---|
| 2008/0279140 | A1* | 11/2008 | Gaur | H04W 72/02 370/329 |
| 2008/0279162 | A1* | 11/2008 | Desai | H04W 72/1215 370/338 |
| 2009/0196273 | A1* | 8/2009 | Kwon | H04W 8/30 370/343 |
| 2010/0182929 | A1* | 7/2010 | Abraham | H04L 45/20 370/252 |
| 2010/0202354 | A1* | 8/2010 | Ho | G06Q 10/06 370/328 |
| 2012/0044879 | A1* | 2/2012 | Park | H04W 74/08 370/329 |
| 2013/0225221 | A1 | 8/2013 | Nentwig et al. | |
| 2015/0036540 | A1* | 2/2015 | Kasslin | H04W 48/18 370/254 |
| 2015/0230245 | A1* | 8/2015 | Choi | H04W 4/70 370/329 |
| 2016/0105888 | A1* | 4/2016 | Seok | H04W 16/10 370/329 |

FOREIGN PATENT DOCUMENTS

| | | |
|---|---|---|
| CN | 101977445 B | 1/2013 |
| CN | 102860115 A | 1/2013 |

OTHER PUBLICATIONS

Choi et al., "Multichannel Random Access in OFDMA Wireless Networks," IEEE Journal on Selected Areas in Communications, vol. 24, No. 3, pp. 603-613, Institute of Electrical and Electronic Engineers (Mar. 2006).

Sen et al., "No Time in Countdown: Migrating Backoff to the Frequency Domain," MobiCom' 11, ACM (Sep. 19-23, 2011).

Kwon et al., "Generalized CSMA/CA for OFDMA Systems: Protocol Design, Throughput Analysis, and Implementation Issues," IEEE Transactions on Wireless Communications, vol. 8, No. 8, pp. 4176-4187, Institute of Electrical and Electronics Engineers, New York, New York, (Aug. 2009).

* cited by examiner

CHANNEL SELECTION METHOD AND TRANSMIT END

CROSS-REFERENCE TO RELATED APPLICATIONS

This application is a continuation of International Application No. PCT/CN2014/085675, filed on Sep. 1, 2014, the disclosure of which is hereby incorporated by reference in its entirety.

TECHNICAL FIELD

The present invention relates to the field of communications technologies, and in particular, to a channel selection method and a transmit end.

BACKGROUND

A Wireless Fidelity (English: Wireless Fidelity, WiFi for short) system can operate in a multi-channel/multi-subchannel scenario. For a multi-channel scenario, a channel selection method for maintaining multiple backoff counters on multiple channels is put forward at present. It is assumed that there are N channels in total in the system, and each channel is corresponding to one backoff counter. When a station (STA for short) or an access point (AP for short) needs to send data, the STA or the AP executes the following processes to select a channel for sending the data: randomly generating backoff count values of backoff counters on all the channels, and simultaneously performing carrier sense multiple access (CSMA for short) access on all the channels; when a backoff count value of an idle channel is decreased to 0, preempting the channel; and determining whether the preempted channel meets a bandwidth requirement, and if the preempted channel meets the bandwidth requirement, ending backoff, or if the preempted channel does not meet the bandwidth requirement, determining whether there is an optional idle channel, and if there is an optional idle channel, adjusting a backoff count value of a backoff counter on the idle channel, and continuing to simultaneously perform CSMA access on all idle channels, or if there is no optional idle channel, ending backoff.

However, the inventor finds that a backoff time required by such a channel selection method is long, thereby resulting in low channel utilization.

SUMMARY

Embodiments provide a channel selection method and a transmit end, which can improve channel utilization.

To resolve the foregoing technical problem, the embodiments disclose the following technical solutions:

According to a first aspect, an embodiment provides a channel selection method, including:

ranking multiple channels, and generating a backoff count value;

sequentially decrementing, from an initial timeslot, the backoff count value in each timeslot according to a ranking sequence of the channels and busy/idle states of all the channels until the backoff count value is 0; and selecting, from the multiple channels according to a result of the decrement performed on the backoff count value and a busy/idle state of at least one of the multiple channels, a channel that is used by a transmit end for sending data.

According to a second aspect, an embodiment provides a transmit end, including: a ranking unit, a generation unit, a decrement unit, and a selection unit, where the ranking unit is configured to rank multiple channels;

the generation unit is configured to generate a backoff count value;

the decrement unit is configured to sequentially decrement, from an initial timeslot, the backoff count value in each timeslot according to a sequence of ranking the channels by the ranking unit and busy/idle states of all the channels until the backoff count value is 0; and the selection unit is configured to select, from the multiple channels according to a result of the decrement performed by the decrement unit on the backoff count value and a busy/idle state of at least one of the multiple channels, a channel that is used by the transmit end for sending data.

In the embodiments, multiple channels are ranked, and a backoff count value is generated; from an initial timeslot, the backoff count value is sequentially decremented in each timeslot according to a ranking sequence of the channels and busy/idle states of all the channels until the backoff count value is 0; and a channel that is used by a transmit end for sending data is selected from the multiple channels according to a result of the decrement performed on the backoff count value and a busy/idle state of at least one of the multiple channels, so that in a channel selection process, all channels use a same backoff count value, and the backoff count value is decremented according to a busy/idle state of each channel, which makes a total subtracted value of the backoff count value in each timeslot greater than or equal to a quantity of idle channels, thereby accelerating a speed of decrementing the backoff count value to 0, shortening a backoff time in the channel selection process, and improving channel utilization.

BRIEF DESCRIPTION OF DRAWINGS

To describe the technical solutions in the embodiments more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

It should be understood that the technical solutions in the embodiments may be applied to a communications system that uses a carrier sense multiple access (CSMA for short) technology. The communications system that uses the CSMA technology may be a wireless local area network (WLAN for short) that uses the CSMA technology and an unlicensed spectrum, for example, Wireless Fidelity (WiFi for short), or Worldwide Interoperability for Microwave Access (WiMAX), or may be a mobile communications system that uses the CSMA technology and an unlicensed spectrum or a licensed spectrum, for example, a Global System for Mobile Communications (GSM for short), a Code Division Multiple Access (CDMA for short) system, a Wideband Code Division Multiple Access (WCDMA for short) system, a general packet radio service (GPRS for short), a Long Term Evolution (LTE for short) system, an LTE frequency division duplex (FDD for short) system, an LTE time division duplex (TDD for short) system, or a Universal Mobile Telecommunications System (UMTS for short).

An access point (AP for short) described in the present invention may be a WLAN AP that uses an unlicensed spectrum, or may be a base station that uses an unlicensed spectrum or a licensed spectrum. The WLAN may be Wireless Fidelity (WiFi for short), or may be Worldwide Interoperability for Microwave Access (WiMAX for short), or the like, which is not limited in the present invention. The base station that uses an unlicensed spectrum or a licensed spectrum may be a base transceiver station (BTS for short) in the GSM or the CDMA, may be a NodeB in the WCDMA, or may be an eNB or an e-NodeB in the LTE, which is not limited in the present invention.

A station (STA for short) may be connected to the Internet by using an AP. The station may be a device with a function such as signal collection, data processing, or wireless communication. For example, the station may be a fixed terminal, or may be a mobile terminal (for example, a mobile phone, or a computer with a mobile terminal).

Figure 1:
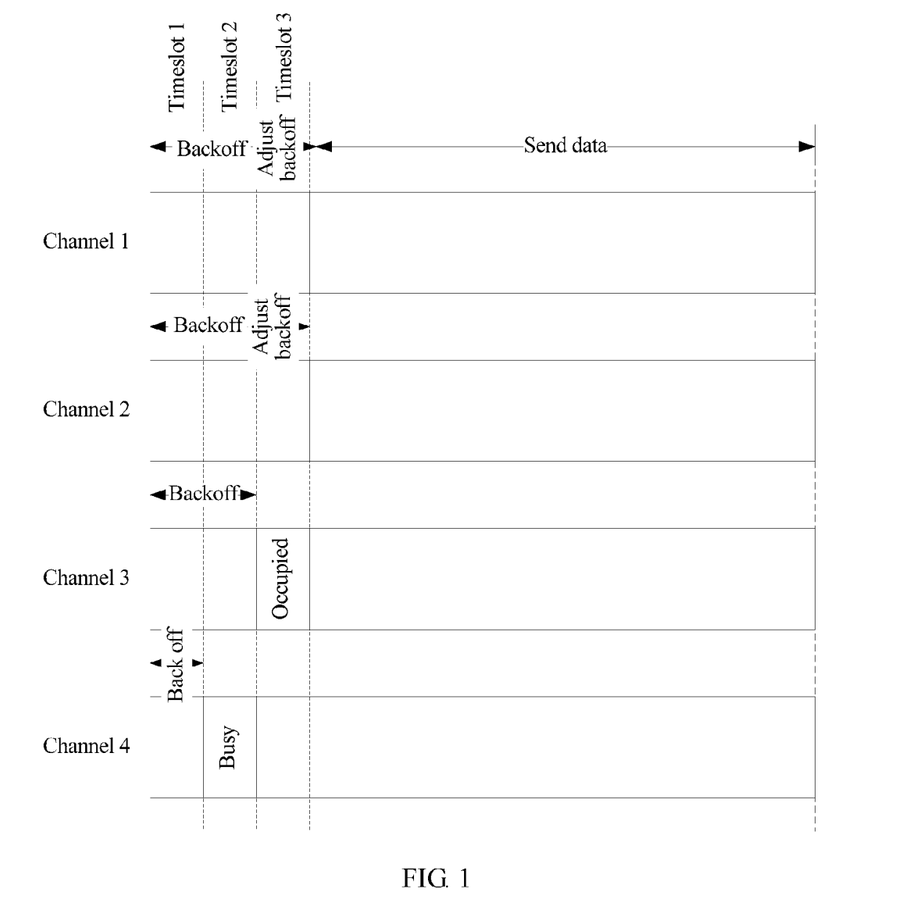
FIG. 1 is a schematic diagram of a channel selection process of multiple channels in the prior art.

In the prior art, a backoff time in a channel selection process is long, and channel utilization is low. Referring to FIG. 1, FIG. 1 is a schematic diagram of an instance of a backoff process involving multiple channels and multiple backoff counters. It is assumed that a STA needs to send data, and a bandwidth requirement is three channels. Four backoff counters are maintained on four channels including a channel 1, a channel 2, a channel 3, and a channel 4, and backoff count values of the backoff counters are 3, 3, 2, and 2 respectively. As shown in FIG. 1, in a timeslot 1, all the four channels are idle, and 1 is subtracted from each backoff count value, that is, 4 is subtracted from the backoff count values of the four idle channels in total. In a timeslot 2, because the channel 4 is busy in the backoff process, backoff stops, and 1 is separately subtracted from the backoff count values of the other three channels, that is, the backoff count value of the channel 3 is decreased to 0, and 3 is subtracted from the backoff count values of the three idle channels in total. In a timeslot 3, because the backoff count value of the channel 3 is already decreased to 0, the STA occupies the channel 3, and 1 is separately subtracted from the backoff count values of the channel 1 and the channel 2, that is, both the backoff count values of the channel 1 and the channel 2 are decreased to 0, and 2 is subtracted from the backoff count values of the three idle channels in total. After the timeslot 3, the backoff count values of the channel 1 and the channel 2 are also decreased to 0, and the bandwidth requirement of the STA is met. From a timeslot 5, the STA starts to send data on the channel 1, the channel 2, and the channel 3.

As shown in the foregoing instance, in the timeslot 3, because the backoff count value of the channel 3 is already decreased to 0, the STA occupies the channel 3, and in the timeslot, only 2 is subtracted from the backoff count values of the three backoff counters on the three idle channels, and a total subtracted value of the backoff count values in the timeslot<a quantity of idle channels. Therefore, a backoff time in the channel selection process is long, and channel utilization is low.

Figure 2:
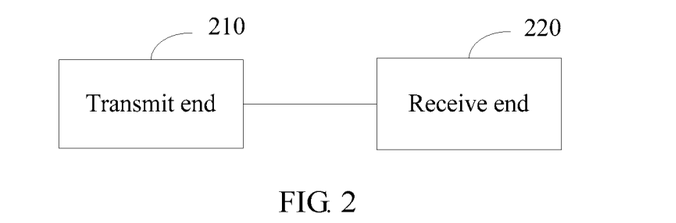
FIG. 2 is an exemplary diagram of an application scenario according to an embodiment.

Referring to FIG. 2, FIG. 2 is an instance of an application scenario according to an embodiment, involving a data transmit end 210 and a data receive end 220. Data is carried between the transmit end 210 and the receive end 220 by using a channel. A channel selection method in this embodiment may be applied to the transmit end 210, so that when the transmit end 210 needs to send data to the receive end 220, the transmit end 210 selects a channel for carrying data.

This embodiment may be applied to a system in which a node needs a random access channel when sending data, for example, the WiFi system mentioned above or an LTE-U system. When the transmit end 210 sends uplink data, the transmit end 210 needs to select an uplink channel, or when the transmit end 210 sends downlink data, the transmit end 210 needs to select a downlink channel. For example, when this embodiment is applied to the WiFi system, the transmit end 210 may be a station STA, the receive end 220 may be an AP or an access point of a basic service set (BSS, Basic Service Set), and the transmit end 210 needs to select an uplink channel; or the transmit end 210 may be an AP or an access point of a BSS, the receive end 220 may be a STA, and the transmit end 210 needs to select a downlink channel.

Figure 3:
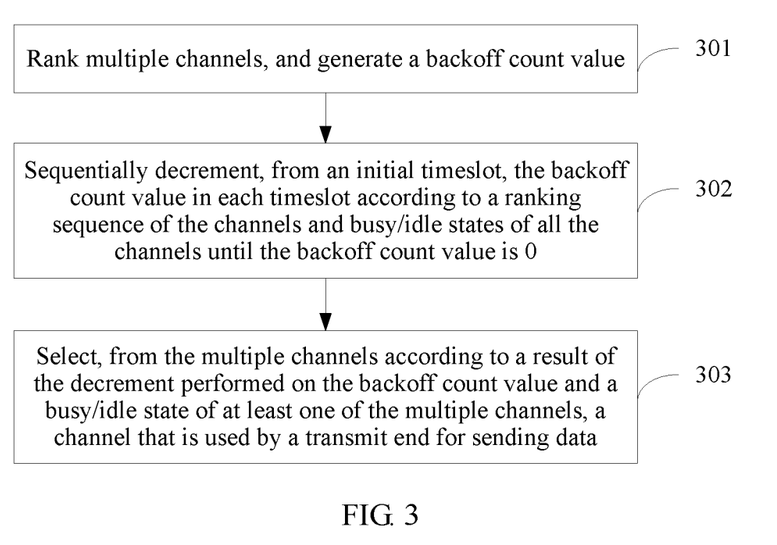
FIG. 3 is a schematic diagram of an embodiment of a channel selection method according to the disclosure.

Referring to FIG. 3, FIG. 3 is a flowchart of an embodiment of a channel selection method according to the disclosure. This embodiment is described from a perspective of a data transmit end.

Step 301: Rank multiple channels, and generate a backoff count value.

When the transmit end sends uplink data, the channel in this embodiment is an uplink channel, or when the transmit end sends downlink data, the channel in this embodiment is a downlink channel.

Because there is a correspondence between a physical channel and a logical channel, the channel in this embodiment may be a physical channel or a logical channel. In a case in which the correspondence between a physical channel and a logical channel is fixed, a processing result in this embodiment is not affected by whether the channel is a physical channel or a logical channel.

Step 302: Sequentially decrement, from an initial timeslot, the backoff count value in each timeslot according to a ranking sequence of the channels and busy/idle states of all the channels until the backoff count value is 0.

The initial timeslot refers to the first timeslot in which the transmit end performs step 302, that is, a timeslot in which the transmit end starts to decrement the backoff count value. Determining of the initial timeslot is related to a time determined by the transmit end for performing channel selection and channel access, and a specific determining method is not described in detail herein.

Step 303: Select, from the multiple channels according to a result of the decrement performed on the backoff count value and a busy/idle state of at least one of the multiple channels, a channel that is used by the transmit end for sending data.

The method may further include: determining a correspondence between the channel and an associated channel. In this embodiment, when the channel is a physical channel, the associated channel is a logical channel; or when the channel is a logical channel, the associated channel is a physical channel. A sequence of performing this step, step 301, step 302, and step 303 is not limited.

In this embodiment, multiple channels are ranked, and a backoff count value is generated; from an initial timeslot, the backoff count value is sequentially decremented in each timeslot according to a ranking sequence of the channels and busy/idle states of all the channels until the backoff count value is 0; and a channel that is used by a transmit end for sending data is selected from the multiple channels according to a result of the decrement performed on the backoff count value and a busy/idle state of at least one of the multiple channels, so that in a channel selection process, all channels use a same backoff count value, and the backoff count value is decremented according to a busy/idle state of each channel, which makes a total subtracted value of the backoff count value in each timeslot greater than or equal to a quantity of idle channels, thereby accelerating a speed of decrementing the backoff count value to 0, shortening a backoff time in the channel selection process, and improving channel utilization.

Figure 4:
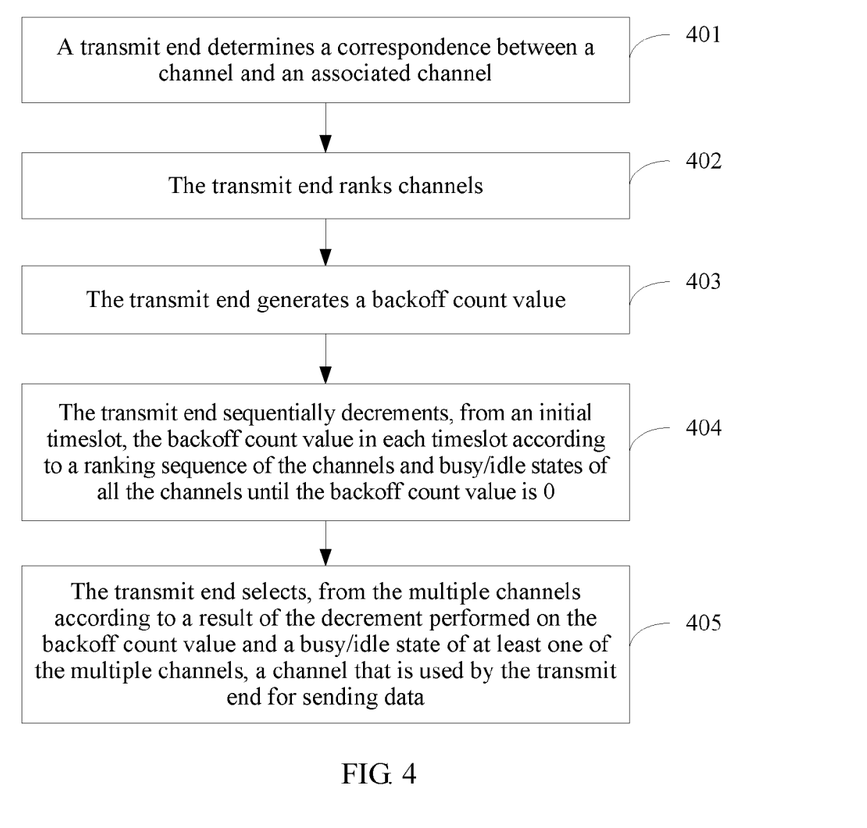
FIG. 4 is a schematic diagram of another embodiment of a channel selection method according to the disclosure.

Referring to FIG. 4, FIG. 4 is a flowchart of another embodiment of a channel selection method according to the disclosure. The method includes the following steps:

Step 401: A transmit end determines a correspondence between a channel and an associated channel.

In step 401, the channel may be a physical channel, the associated channel may be a logical channel; or the channel may be a logical channel, the associated channel may be a physical channel. Therefore, in step 401, the transmit end actually determines a correspondence between a physical channel and a logical channel.

The physical channel involved in step 401 may be all or some of physical channels that can be sensed by the transmit end, which is not limited in this embodiment. Similarly, the logical channel involved in step 401 may be all or some of logical channels between the transmit end and a receive end, which is not limited in this embodiment.

In a first possible implementation manner, step 401 may include:

determining, by the transmit end, a correspondence between a physical channel and a logical channel according to frequencies of the physical channel and the logical channel, so that when physical channels are ranked according to frequencies, logical channels corresponding to the physical channels are also ranked according to a same frequency sequence.

For example, assuming a quantity of physical channels is 15, and a quantity of logical channels is 15, the 15 physical channels are numbered as a physical channel 1 to a physical channel 15 respectively according to frequencies in a descending order, and the logical channels are numbered as a logical channel 1 to a logical channel 15 respectively according to the frequencies in the descending order. In this case, the correspondence between a physical channel and a logical channel may be determined as follows: the physical channel 1 is corresponding to the logical channel 1, the physical channel 2 is corresponding to the logical channel 2, and by analogy, until the physical channel 15 is corresponding to the logical channel 15, as shown in the first column and the second column in the following Table 1.

If the channel selection method in this embodiment is applied to a WiFi system, when the correspondence between a physical channel and a logical channel is determined in the first possible implementation manner, a probability that a channel use conflict occurs between neighboring BSSs on some channels is relatively high.

For example, assuming a BSS1, a BSS2, and a BSS3 are neighboring BSSs, an access point of the BSS1 is an access point 1, an access point of the BSS2 is an access point 2, and an access point of the BSS3 is an access point 3. In a case of a same decrement step, a same initial timeslot, a same ranking sequence of physical channels, and a same correspondence between a physical channel and a logical channel, if the access point 1 and the access point 3 are corresponding to a same backoff random number, a reference channel obtained by the access point 1 is necessarily the same as that obtained by the access point 3. In step 405, if the access point 1 and the access point 3 use a same implementation method for selecting, according to the reference channel, a channel for sending data, a channel selected by the access point 1 for sending data is also the same as that selected by the access point 3, and consequently the access point 1 and the access point 3 send data on the same channel, and a channel use conflict occurs between the BSS1 and the BSS3. For example, as shown in Table 1, assuming the decrement step is 1, initial timeslots are the same, a backoff random number of the access point 1 is 5, a backoff random number of the access point 2 is 4, and a backoff random number of the access point 3 is 5, both a reference channel obtained by the access point 1 and a reference channel obtained by the access point 3 are a physical channel 5 (a logical channel 5). Further, if the access point 1 and the access point 3 use a same implementation method for selecting, according to the reference channel, a channel for sending data, the access point 1 and the access point 3 select a same channel for sending data, and consequently the access point 1 and the access point 3 send data on the same channel, and a channel use conflict occurs between the BSS1 and the BSS3.

TABLE 1

| | | Access point 1 (BSS1) | Access point 2 (BSS2) | Access point 3 (BSS3) |
|---|---|---|---|---|
| Physical channel 0 | Logical channel 0 | 0 | 0 | 0 |
| Physical channel 1 | Logical channel 1 | 1 | 1 | 1 |
| Physical channel 2 | Logical channel 2 | 2 | 2 | 2 |
| Physical channel 3 | Logical channel 3 | 3 | 3 | 3 |
| Physical channel 4 | Logical channel 4 | 4 | 4 | 4 |
| Physical channel 5 | Logical channel 5 | 5 | 5 | 5 |
| Physical channel 6 | Logical channel 6 | 6 | 6 | 6 |
| Physical channel 7 | Logical channel 7 | 7 | 7 | 7 |
| Physical channel 8 | Logical channel 8 | 8 | 8 | 8 |
| Physical channel 9 | Logical channel 9 | 9 | 9 | 9 |
| Physical channel 10 | Logical channel 10 | 10 | 10 | 10 |
| Physical channel 11 | Logical channel 11 | 11 | 11 | 11 |
| Physical channel 12 | Logical channel 12 | 12 | 12 | 12 |
| Physical channel 13 | Logical channel 13 | 13 | 13 | 13 |
| Physical channel 14 | Logical channel 14 | 14 | 14 | 14 |
| Physical channel 15 | Logical channel 15 | 15 | 15 | 15 |

Therefore, this embodiment further provides the following second and third possible implementation manners, so as to reduce the probability of a channel use conflict between BSSs. It should be noted that, the second and the third possible implementation manners can reduce the probability of a channel use conflict between BSSs only in a case in which the channel is a logical channel, that is, the transmit end directly selects a logical channel for sending data. However, the second and the third possible implementation manners may also be applicable to a case in which the channel is a physical channel, that is, the transmit end directly selects a physical channel for sending data.

In the second possible implementation manner, step 401 may include:

randomly determining, by the transmit end, a correspondence between a physical channel and a logical channel.

In the third possible implementation manner, step 401 may include:

numbering, by the transmit end, a physical channel and a logical channel according to a same frequency sequence, and determining a correspondence between a physical channel and a logical channel according to the following number relationship: logical channel number=(physical channel number+offset random number) mod total quantity of physical channels.

In the third possible implementation manner, when this embodiment is applied to the WiFi system, nodes of a same BSS such as STAs, APs, or access points may use a same offset random number, and nodes of different BSSs may use different offset random numbers, that is, an offset random number is associated with a BSS, and different BSSs are corresponding to different offset random numbers. In this way, the probability of a channel use conflict between neighboring BSSs can be reduced.

For example:

The foregoing BSS1, BSS2, and BSS3 are still used as an example. Assuming an offset random number of the BSS1 is 11, an offset random number of the BSS2 is 8, and an offset random number of the BSS3 is 4, logical channel number in the BSS1=(physical channel number+11) mod 16, logical channel number in the BSS2=(physical channel number+8) mod 16, and logical channel number in the BSS3=(physical channel number+4) mod 16. In this case, a correspondence between logical channel numbers in the BSS1, the BSS2, and the BSS3 and physical channel numbers are shown in Table 2.

TABLE 2

|  | BSS1 | BSS2 | BSS3 |
|---|---|---|---|
| Physical channel 0 | Logical channel 11 | Logical channel 8 | Logical channel 4 |
| Physical channel 1 | Logical channel 12 | Logical channel 9 | Logical channel 5 |
| Physical channel 2 | Logical channel 13 | Logical channel 10 | Logical channel 6 |
| Physical channel 3 | Logical channel 14 | Logical channel 11 | Logical channel 7 |
| Physical channel 4 | Logical channel 15 | Logical channel 12 | Logical channel 8 |
| Physical channel 5 | Logical channel 0 | Logical channel 13 | Logical channel 9 |
| Physical channel 6 | Logical channel 1 | Logical channel 14 | Logical channel 10 |
| Physical channel 7 | Logical channel 2 | Logical channel 15 | Logical channel 11 |
| Physical channel 8 | Logical channel 3 | Logical channel 0 | Logical channel 12 |
| Physical channel 9 | Logical channel 4 | Logical channel 1 | Logical channel 13 |
| Physical channel 10 | Logical channel 5 | Logical channel 2 | Logical channel 14 |
| Physical channel 11 | Logical channel 6 | Logical channel 3 | Logical channel 15 |
| Physical channel 12 | Logical channel 7 | Logical channel 4 | Logical channel 0 |
| Physical channel 13 | Logical channel 8 | Logical channel 5 | Logical channel 1 |
| Physical channel 14 | Logical channel 9 | Logical channel 6 | Logical channel 2 |
| Physical channel 15 | Logical channel 10 | Logical channel 8 | Logical channel 3 |

TABLE 2-continued

In this case, still according to the foregoing instance, assuming the decrement step is 1, initial timeslots are the same, a backoff random number of the access point 1 is 5, a backoff random number of the access point 2 is 4, and a backoff random number of the access point 3 is 5. If logical channels are traversed in each timeslot according to a sequence of logical channels 0 to 15 to decrement a backoff random number, both a reference channel obtained by the access point 1 and a reference channel obtained by the access point 3 are a logical channel 5, and a reference channel obtained by the access point 2 is a logical channel 4. However, it may be learned from a correspondence in Table 2 that the logical channel 5 in the access point 1 is corresponding to a physical channel 10, the logical channel 4 in the access point 2 is corresponding to a physical channel 12, and the logical channel 5 in the access point 3 is corresponding to a physical channel 1. The physical channels used by the three access points are different, thereby reducing the probability of a channel use conflict between neighboring BSSs.

Step 402: The transmit end ranks channels.

The transmit end may rank the channels according to a channel frequency sequence, or may randomly rank the channels, which is not limited in this embodiment.

Step 403: The transmit end generates a backoff count value.

In a first possible implementation manner, the transmit end may randomly generate the backoff random number.

In a second possible implementation manner, the transmit end may determine a value of a contention window according to system load and a quantity of channels required by the transmit end, and randomly generate the backoff count value within a value range of the contention window.

Specifically, the transmit end may determine a standard value A of a contention window according to the system load, and then use a product of the standard value and the quantity of channels required by the transmit end as a value of the contention window. For example, assuming the standard value A=32, if the quantity of channels required by the transmit end is 1, the determined value of the contention window is 32, and if the quantity of channels required by the transmit end is 2, the determined value of the contention window is 64.

In this implementation manner, higher system load may lead to a smaller standard value A, and lower system load may lead to a larger standard value A. Therefore, higher system load leads to a smaller quantity of logical channels that can be selected by the transmit end, and lower system load leads to a larger quantity of logical channels that can be selected by the transmit end. In addition, in a case of a same standard value A, for two transmit ends that need channels of different quantities, a transmit end that needs channels of a smaller quantity is corresponding to a smaller value of a contention window, and a transmit end that needs channels of a larger quantity is corresponding to a larger value of a contention window. Therefore, when the backoff count value is randomly generated within the value range of the contention window, a probability that a backoff count value generated by the transmit end that needs channels of a smaller quantity is smaller than a backoff count value generated by the transmit end that needs channels of a larger quantity is higher, and accordingly a probability that the transmit end that needs channels of a smaller quantity preferentially accesses a channel is higher.

A sequence of performing the three steps including step 401 to step 403 is not limited.

Step 404: The transmit end sequentially decrements, from an initial timeslot, the backoff count value in each timeslot according to a ranking sequence of the channels and busy/idle states of all the channels until the backoff count value is 0.

In this embodiment, a next idle channel of a channel whose backoff count value is 0 is referred to as a reference channel.

The decrementing the backoff count value may include:

for each channel, subtracting a decrement step from a result of decrement performed according to a busy/idle state of a previous channel of the channel, and using an obtained value as the updated backoff count value; or when the channel is busy, using a result of decrement performed according to a busy/idle state of a previous channel of the channel as the updated backoff count value, where the decrement step is greater than or equal to 1.

The decrement step may be any natural number, and a specific value of the decrement step is not limited in the present invention. The specific value of the decrement step may be preset in the transmit end.

Alternatively, the decrementing the backoff count value may include:

determining, in each timeslot, a decrement step in a current timeslot; and for each channel, when the channel is idle, subtracting a decrement step from a result of decrement performed according to a busy/idle state of a previous channel of the channel, and using an obtained value as the updated backoff count value; or when the channel is busy, using a result of decrement performed according to a busy/idle state of a previous channel of the channel as the updated backoff count value, where the decrement step is greater than or equal to 1.

The determining a decrement step in a current timeslot may include:

determining that the decrement step is 1; or determining the decrement step according to the following formula: decrement step=quantity of idle channels in the current timeslot div quantity of channels required by the transmit end.

For example, assuming the quantity of idle channels in the current timeslot is 9, and the quantity of channels required by the transmit end is 2, the decrement step in the current timeslot=9 div 2=4.

The busy/idle states of all the channels may be implemented by performing continuous sensing by the transmit end on the channels, and a specific sensing method is not described in detail in the present invention.

Figure 5A:
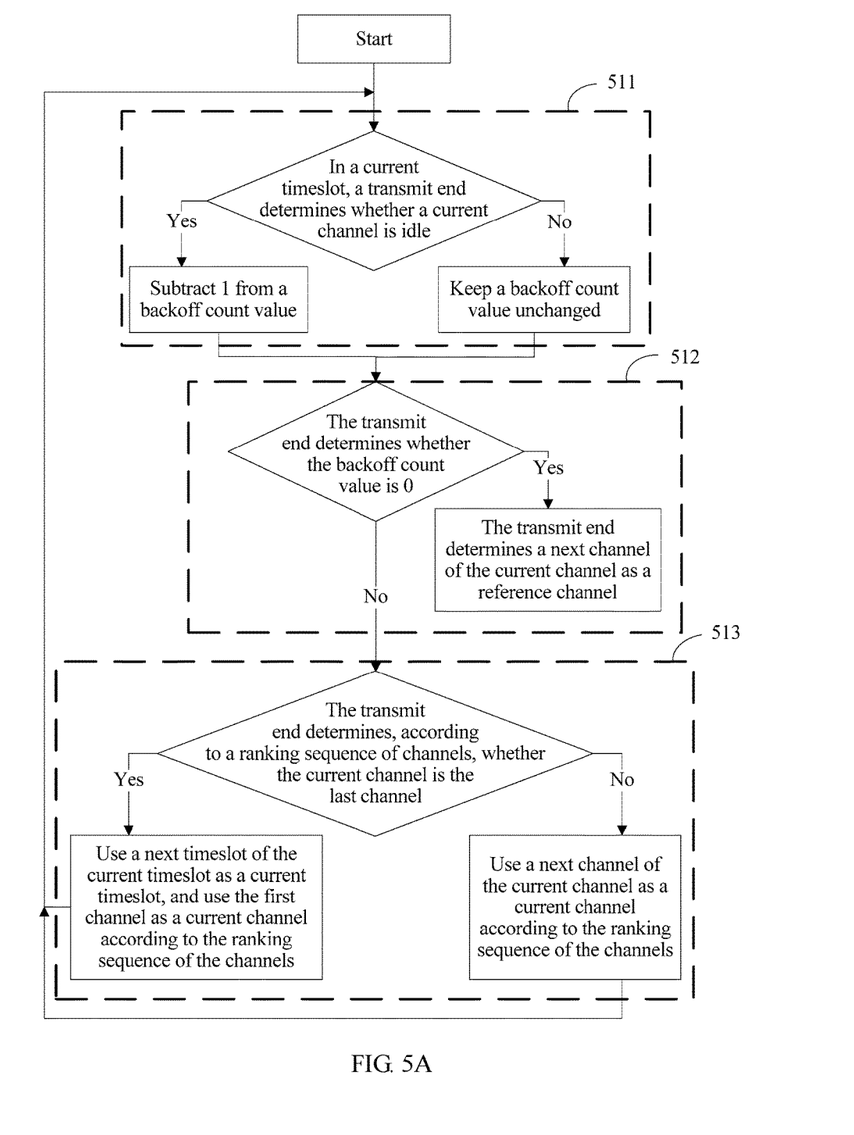
FIG. 5A is a schematic diagram of an implementation method of step 401 according to the disclosure.

In a possible implementation manner, specific implementation of step 404 may be implemented by using a method shown in FIG. 5A.

Step 511: In a current timeslot, the transmit end determines whether a current channel is idle, and if the current channel is idle, 1 is subtracted from the backoff count value; or if the current channel is not idle (busy), the backoff count value keeps unchanged.

An initial value of the current timeslot is the initial timeslot, and an initial value of the current channel is a channel whose ranking sequence is 1 in the ranking sequence of the channels.

Step 512: The transmit end determines whether the backoff count value is 0, and if the backoff count value is 0, the transmit end determines a next channel of the current channel as a reference channel, and ends the procedure; or if the backoff count value is not 0, performs step 513.

Step 513: The transmit end determines, according to the ranking sequence of the channels, whether the current channel is the last channel, and if the current channel is the last channel, uses a next timeslot of the current timeslot as a current timeslot, uses the first channel as a current channel according to the ranking sequence of the channels, and goes to step 511; or if the current channel is not the last channel, uses a next channel of the current channel as a current channel according to the ranking sequence of the channels, and goes to step 511.

According to the foregoing method shown in FIG. 5A, the channels are first traversed in the initial timeslot according to the ranking sequence of the channels. If the backoff count value is not decreased to 0 after the channels are traversed, the channels are still traversed according to the ranking sequence of the channels in a next timeslot of the initial timeslot; and by analogy, until when an idle channel is traversed in a timeslot, a value obtained after 1 is subtracted from the backoff count value is 0, and a reference channel is obtained. In addition, in each timeslot, if a traversed channel is busy, the backoff count value keeps unchanged, and if a traversed channel is idle, 1 is subtracted from the backoff count value. In a decrement process, when an idle channel is traversed in a timeslot, a value obtained after 1 is subtracted from the backoff count value is 0, and a next idle channel of the idle channel is a reference channel.

For example:

Assuming a quantity of physical channels is 16, the 16 physical channels are numbered as a physical channel 0 to a physical channel 15 according to frequencies in an ascending order. An initial timeslot is a timeslot 0, timeslots following the timeslot 0 are sequentially a timeslot 1, a timeslot 2, and a timeslot 3 . . . , a backoff random number is 48, and a busy/idle state of each physical channel in each timeslot is shown in Table 1. To facilitate description of a decrement process of a backoff counter, if a physical channel is busy in a corresponding timeslot, "Busy" is used in the table for indication, and if a physical channel is idle in a corresponding timeslot, serial numbers starting from 0 are used for indication.

Referring to the following Table 3, first, in the timeslot 0, the physical channel 0 to the physical channel 15 are traversed according to a sequence from the physical channel 0 to the physical channel 15, and because the physical channel 0 to the physical channel 15 all are in an idle state in the timeslot 0, the backoff count value is decreased to 32. Then, in the timeslot 1, the physical channel 0 to the physical channel 15 are traversed according to the sequence from the physical channel 0 to the physical channel 15, and because the physical channel 0 to the physical channel 15 all are in an idle state in the timeslot 1, the backoff count value is decreased to 16. Then, in the timeslot 2, the physical channel 0 to the physical channel 15 are traversed according to the sequence from the physical channel 0 to the physical channel 15, and because the physical channel 4 and the physical channel 5 are in a busy state in the timeslot 2, and the other physical channels are in an idle state in the timeslot 2, the backoff count value is decreased to 2. Then, in the timeslot 3, the physical channel 0 to the physical channel 15 are traversed according to the sequence from the physical channel 0 to the physical channel 15, and when traversal of the physical channels is performed on the physical channel 1, the backoff count value is decreased to 0, and a next idle physical channel of the physical channel 1, that is, the physical channel 2, is used as a reference channel.

TABLE 3

|  | Timeslot 0 | Timeslot 1 | Timeslot 2 | Timeslot 3 | Timeslot 4 | ... |
|---|---|---|---|---|---|---|
| Physical channel 0 | 0 | 16 | 32 | 46 | 59 | ... |
| Physical channel 1 | 1 | 17 | 33 | 47 | 60 | ... |
| Physical channel 2 | 2 | 18 | 34 | 48 | 61 | ... |
| Physical channel 3 | 3 | 19 | 35 | 49 | 62 | ... |
| Physical channel 4 | 4 | 20 | Busy | Busy | Busy | ... |
| Physical channel 5 | 5 | 21 | Busy | Busy | Busy | ... |
| Physical channel 6 | 6 | 22 | 36 | 50 | 63 | ... |
| Physical channel 7 | 7 | 23 | 37 | 51 | 64 | ... |
| Physical channel 8 | 8 | 24 | 38 | Busy | Busy | ... |
| Physical channel 9 | 9 | 25 | 39 | 52 | 65 | ... |
| Physical channel 10 | 10 | 26 | 40 | 53 | 66 | ... |
| Physical channel 11 | 11 | 27 | 41 | 54 | 67 | ... |
| Physical channel 12 | 12 | 28 | 42 | 55 | 68 | ... |
| Physical channel 13 | 13 | 29 | 43 | 56 | 69 | ... |
| Physical channel 14 | 14 | 30 | 44 | 57 | 70 | ... |
| Physical channel 15 | 15 | 31 | 45 | 58 | 71 | ... |

Figure 5B:
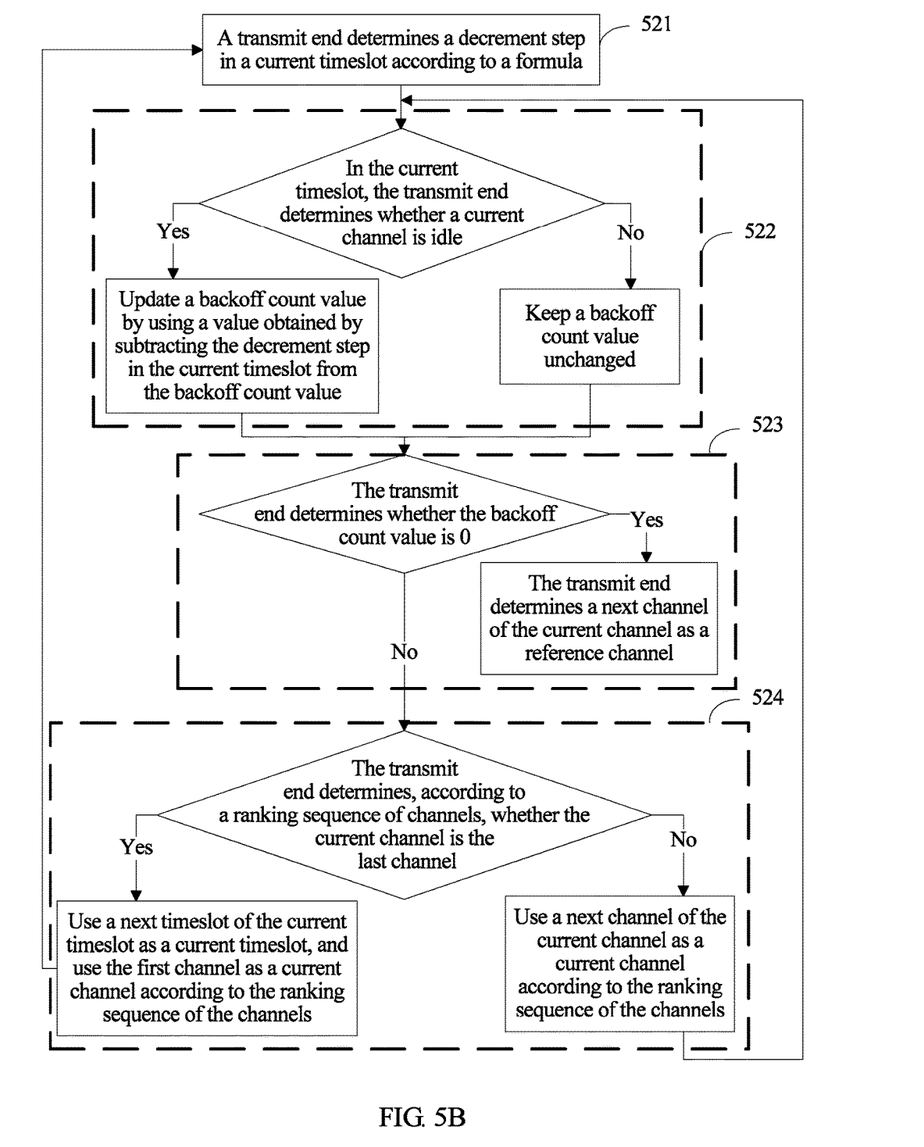
FIG. 5B is a schematic diagram of another implementation method of step 401 according to the disclosure.

In another possible implementation manner, specific implementation of step 404 may be implemented by using a method shown in FIG. 5B.

Step 521: The transmit end determines a decrement step in a current timeslot according to a formula: decrement step=quantity of idle channels in the current timeslot div quantity of channels required by the transmit end.

Step 522: In the current timeslot, the transmit end determines whether a current channel is idle, and if the current channel is idle, the backoff count value is updated by using a value obtained by subtracting the decrement step in the current timeslot from the backoff count value; or if the current channel is not idle (busy), the backoff count value keeps unchanged.

An initial value of the current timeslot is the initial timeslot, and an initial value of the current channel is a channel whose ranking sequence is 1 in the ranking sequence of the channels.

Step 523: The transmit end determines whether the backoff count value is 0, and if the backoff count value is 0, determines a next channel of the current channel as a reference channel, and ends the procedure; or if the backoff count value is not 0, performs step 524.

Step 524: The transmit end determines, according to the ranking sequence of the channels, whether the current channel is the last channel, and if the current channel is the last channel, uses a next timeslot of the current timeslot as a current timeslot, uses the first channel as a current channel according to the ranking sequence of the channels, and goes to step 521; or if the current channel is not the last channel, uses a next channel of the current channel as a current channel according to the ranking sequence of the channels, and goes to step 522.

A difference between FIG. 5B and FIG. 5A lies only in that: a decrement step in each timeslot in the method shown in FIG. 5A is 1, while in the method shown in FIG. 5B, a decrement step in each timeslot is determined according to a quantity of idle channels in the timeslot and the quantity of channels required by the transmit end. In comparison to the method shown in FIG. 5A, the decrement step in each timeslot in the method shown in FIG. 5B may be 1 or a value greater than 1. Therefore, when a backoff count value is decremented by using the method shown in FIG. 5B, a speed of decrementing the backoff count value to 0 is higher, a backoff time in a channel selection process is shorter, and further channel utilization is improved.

For example:

Assuming a quantity of physical channels is 16, the 16 physical channels are numbered as a physical channel 0 to a physical channel 15 according to frequencies in an ascending order. A quantity of channels required by the transmit end is 4. An initial timeslot is a timeslot 0, timeslots following the timeslot 0 are sequentially a timeslot 1, a timeslot 2, and a timeslot 3 . . . , a backoff random number is 48, and a busy/idle state of each physical channel in each timeslot is shown in Table 2. If a physical channel is busy in a corresponding timeslot, "Busy" is used in the table for indication, and if a physical channel is idle in a corresponding timeslot, "Idle" is used in the table for indication.

Referring to the following Table 4, because there are eight idle physical channels in the timeslot 0, a decrement step in the timeslot 0 is: 8 div 4=2. In the timeslot 0, the physical channel 0 to the physical channel 15 are traversed according to a sequence from the physical channel 0 to the physical channel 15, and because the eight physical channels are in an idle state in the timeslot 0, the backoff count value is decreased to 32. Then, because there are eight idle physical channels in the timeslot 1, a decrement step in the timeslot 0 is also 2. In the timeslot 1, the physical channel 0 to the physical channel 15 are traversed according to the sequence from the physical channel 0 to the physical channel 15, and because the eight physical channels are in an idle state in the timeslot 1, the backoff count value is decreased to 16. Then, because there are 14 idle physical channels in the timeslot 2, a decrement step in the timeslot 2 is: 14 div 4=3. In the timeslot 2, the physical channel 0 to the physical channel 15 are traversed according to the sequence from the physical channel 0 to the physical channel 15, and when traversal of the physical channels is performed on the physical channel 7, the backoff count value is decreased to 0, and a next idle physical channel of the physical channel 7, that is, the physical channel 8, is used as a reference channel.

TABLE 4

|  | Timeslot 0 | Timeslot 1 | Timeslot 2 | ... |
|---|---|---|---|---|
| Physical channel 0 | Idle | Busy | Busy | ... |
| Physical channel 1 | Idle | Idle | Busy | ... |
| Physical channel 2 | Idle | Idle | Idle | ... |
| Physical channel 3 | Idle | Idle | Idle | ... |
| Physical channel 4 | Busy | Idle | Idle | ... |
| Physical channel 5 | Busy | Busy | Idle | ... |
| Physical channel 6 | Busy | Busy | Idle | ... |
| Physical channel 7 | Busy | Busy | Idle | ... |

TABLE 4-continued

|  | Timeslot 0 | Timeslot 1 | Timeslot 2 | ... |
|---|---|---|---|---|
| Physical channel 8 | Idle | Busy | Idle | ... |
| Physical channel 9 | Idle | Idle | Idle | ... |
| Physical channel 10 | Idle | Idle | Idle | ... |
| Physical channel 11 | Idle | Busy | Idle | ... |
| Physical channel 12 | Busy | Busy | Idle | ... |
| Physical channel 13 | Busy | Idle | Idle | ... |
| Physical channel 14 | Busy | Busy | Idle | ... |
| Physical channel 15 | Busy | Idle | Idle | ... |

Step 405: The transmit end selects, from the multiple channels according to a result of the decrement performed on the backoff count value and a busy/idle state of at least one of the multiple channels, a channel that is used by the transmit end for sending data.

Step 405 may include:

using a next idle channel of a channel whose backoff count value is 0 as a reference channel, determining m1 idle channels preceding the reference channel, the reference channel, and n1 idle channels following the reference channel as a channel candidate set according to the ranking sequence of the channels, and selecting, from the channel candidate set, p channels as channels that are used by the transmit end for sending data, where $m1>=0$, $n1>=0$, both m1 and n1 are integers, $m1+n1>=p-1$, and p is the quantity of channels required by the transmit end.

The p channels may be randomly selected from the channel candidate set or a channel with optimal channel quality may be preferentially selected from the channel candidate set, which is not limited in this embodiment.

For example, assuming $m1=3$, $n1=3$, and $p=1$, logical channels are ranked according to a sequence of logical channels 0 to 15, and the reference channel eventually obtained in step 404 is the logical channel 8. In this case, assuming logical channels 5 to 7 and logical channels 9 to 11 all are in an idle state in a current timeslot, a logical channel may be randomly selected from logical channels 5 to 11 as the channel that is used by the transmit end for sending data, or a logical channel with best channel quality may be selected from logical channels 5 to 11 as the channel that is used by the transmit end for sending data.

Alternatively, step 405 may include:

using a next idle channel of a channel whose backoff count value is 0 as a reference channel, and determining, according to the ranking sequence of the channels, m2 idle channels preceding the reference channel, the reference channel, and n2 idle channels following the reference channel as channels that are used by the transmit end for sending data, where $m2>=0$, $n2>=0$, both m2 and n2 are integers, and $m2+n2=p-1$.

For example, assuming $m2=1$, $n1=1$, and $p=3$, logical channels are ranked according to a sequence of logical channels 0 to 15, and the reference channel eventually obtained in step 404 is the logical channel 8. In this case, assuming both the logical channel 7 and the logical channel 9 are in an idle state in a current timeslot, logical channels 7 to 9 may be selected as channels that are used by the transmit end for sending data.

In this embodiment, in a channel selection process, all channels use a same backoff count value, and the backoff count value is decremented according to a busy/idle state of each channel, which makes a total subtracted value of the backoff count value in each timeslot greater than or equal to a quantity of idle channels, thereby accelerating a speed of decrementing the backoff count value to 0, shortening a backoff time in the channel selection process, and improving channel utilization.

Corresponding to an embodiment of a channel selection method in the present invention, the present invention further provides an embodiment of a transmit end.

Figure 6:
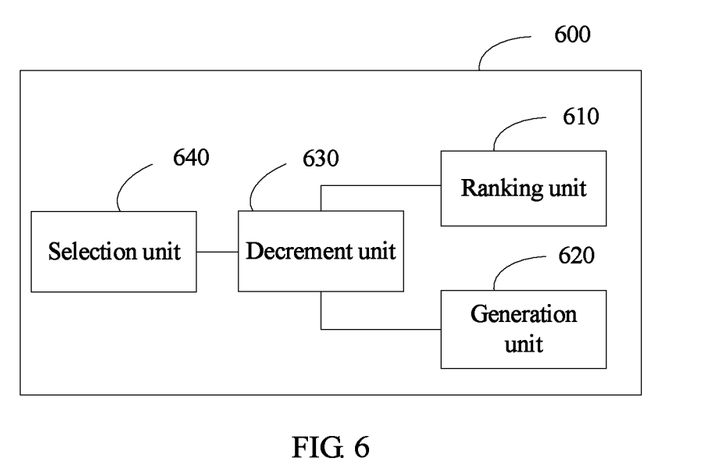
FIG. 6 is a schematic diagram of an embodiment of a transmit end according to the disclosure.

Referring to FIG. 6, FIG. 6 is a block diagram of an embodiment of a transmit end according to the disclosure. The transmit end 600 includes: a ranking unit 610, a generation unit 620, a decrement unit 630, and a selection unit 640.

The ranking unit 610 is configured to rank multiple channels.

The generation unit 620 is configured to generate a backoff count value.

The decrement unit 630 is configured to sequentially decrement, from an initial timeslot, the backoff count value in each timeslot according to a sequence of ranking the channels by the ranking unit and busy/idle states of all the channels until the backoff count value is 0.

The selection unit 640 is configured to select, from the multiple channels according to a result of the decrement performed by the decrement unit 630 on the backoff count value and a busy/idle state of at least one of the multiple channels, a channel that is used by the transmit end for sending data.

Optionally, the decrement unit 630 may be specifically configured to:

for each channel, when the channel is idle, subtract a decrement step from a result of decrement performed according to a busy/idle state of a previous channel of the channel, and use an obtained value as the updated backoff count value; or when the channel is busy, use a result of decrement performed according to a busy/idle state of a previous channel of the channel as the updated backoff count value, where the decrement step is greater than or equal to 1.

Optionally, the decrement unit 630 may be further configured to determine, in each timeslot, a decrement step in a current timeslot.

Optionally, the decrement unit 630 may be specifically configured to:

determine the decrement step according to the following formula: decrement step=quantity of idle channels in the current timeslot div quantity of channels required by the transmit end.

Optionally, the selection unit 640 may be specifically configured to:

use a next idle channel of a channel whose backoff count value is 0 as a reference channel, determine m1 idle channels preceding the reference channel, the reference channel, and n1 idle channels following the reference channel as a channel candidate set according to the ranking sequence of the channels, and select, from the channel candidate set, p channels as channels that are used by the transmit end for sending data, where $m1>=0$, $n1>=0$, both m1 and n1 are integers, $m1+n1>=p-1$, and p is the quantity of channels required by the transmit end.

Optionally, the generation unit 620 may be specifically configured to:

randomly generate the backoff count value; or determine a value of a contention window according to system load and the quantity of channels required by the transmit end, and randomly generate the backoff count value within a value range of the contention window.

Optionally, the transmit end may further include: a determining unit, configured to determine a correspondence between the channel and an associated channel, where when the channel is a physical channel, the associated channel is a logical channel; or when the channel is a logical channel, the associated channel is a physical channel.

Optionally, the determining unit may be specifically configured to:

randomly determine a correspondence between a physical channel and a logical channel; or determine a correspondence between a physical channel and a logical channel according to frequencies of the physical channel and the logical channel, so that when physical channels are ranked according to frequencies, logical channels corresponding to the physical channels are also ranked according to a same frequency sequence; or number a physical channel and a logical channel according to a same frequency sequence, and determine a correspondence between a physical channel and a logical channel according to the following number relationship: logical channel number=(physical channel number+offset random number) mod total quantity of physical channels.

In this embodiment, in a channel selection process, all channels use a same backoff count value, and the backoff count value is decremented according to a busy/idle state of each channel, which makes a total subtracted value of the backoff count value in each timeslot greater than or equal to a quantity of idle channels, thereby accelerating a speed of decrementing the backoff count value to 0, shortening a backoff time in the channel selection process, and improving channel utilization.

Figure 7:
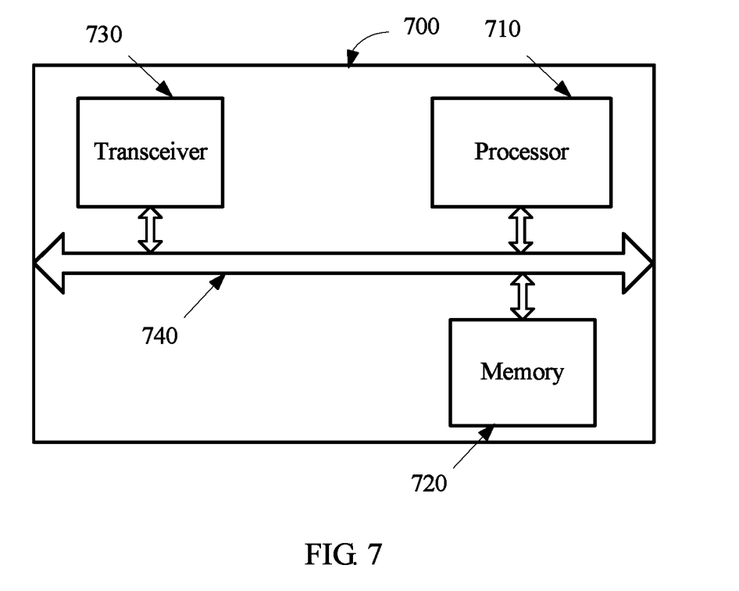
FIG. 7 is a schematic diagram of another embodiment of a transmit end according to the disclosure.

Referring to FIG. 7, FIG. 7 is a schematic structural diagram of a transmit end according to an embodiment. The transmit end may be a STA, an AP, an access point, or the like in a WiFi system. The transmit end 700 includes: a processor 710, a memory 720, a transceiver 730, and a bus 740.

The processor 710, the memory 720, and the transceiver 730 are connected to each other by using the bus 740, and the bus 740 may be an ISA bus, a PCI bus, an EISA bus, or the like. The bus may be classified into an address bus, a data bus, a control bus, and the like. For ease of denotation, the bus is indicated by using only one thick line in FIG. 7; however, it does not indicate that there is only one bus or only one type of bus.

The memory 720 is configured to store a program. Specifically, the program may include program code, and the program code includes a computer operation instruction. The memory 720 may include a high-speed RAM memory, and may further include a non-volatile memory (non-volatile memory), for example, at least one magnetic disk memory.

The transceiver 730 is configured to connect to another device and communicate with the another device.

The processor 710 executes the program code, so as to: rank multiple channels, and generate a backoff count value; sequentially decrement, from an initial timeslot, the backoff count value according to a ranking sequence of the channels and busy/idle states of all the channels until the backoff count value is 0; and select, from the multiple channels according to a result of the decrement performed on the backoff count value and a busy/idle state of at least one of the multiple channels, a channel that is used by the transmit end for sending data.

Optionally, the processor 710 may be specifically configured to:

for each channel, when the channel is idle, subtract a decrement step from a result of decrement performed according to a busy/idle state of a previous channel of the channel, and use an obtained value as the updated backoff count value; or when the channel is busy, use a result of decrement performed according to a busy/idle state of a previous channel of the channel as the updated backoff count value, where the decrement step is greater than or equal to 1.

Optionally, the processor 710 may be further configured to determine, in each timeslot, a decrement step in a current timeslot.

Optionally, the processor 710 may be specifically configured to determine the decrement step according to the following formula: decrement step=quantity of idle channels in the current timeslot div quantity of channels required by the transmit end.

Optionally, the processor 710 may be specifically configured to:

use a next idle channel of a channel whose backoff count value is 0 as a reference channel, determine m1 idle channels preceding the reference channel, the reference channel, and n1 idle channels following the reference channel as a channel candidate set according to the ranking sequence of the channels, and select, from the channel candidate set, p channels as channels that are used by the transmit end for sending data, where m1>=0, n1>=0, both m1 and n1 are integers, m1+n1>=p−1, and p is the quantity of channels required by the transmit end.

Optionally, the processor 710 may be specifically configured to:

randomly generate the backoff count value; or determine a value of a contention window according to system load and the quantity of channels required by the transmit end, and randomly generate the backoff count value within a value range of the contention window.

Optionally, the processor 710 may be further configured to:

determine a correspondence between the channel and an associated channel, where when the channel is a physical channel, the associated channel is a logical channel; or when the channel is a logical channel, the associated channel is a physical channel.

Optionally, the processor 710 may be specifically configured to:

randomly determine a correspondence between a physical channel and a logical channel; or determine a correspondence between a physical channel and a logical channel according to frequencies of the physical channel and the logical channel, so that when physical channels are ranked according to frequencies, logical channels corresponding to the physical channels are also ranked according to a same frequency sequence; or number a physical channel and a logical channel according to a same frequency sequence, and determine a correspondence between a physical channel and a logical channel according to the following number relationship: logical channel number=(physical channel number+offset random number) mod total quantity of physical channels.

In this embodiment, in a channel selection process, all channels use a same backoff count value, and the backoff count value is decremented according to a busy/idle state of each channel, which makes a total subtracted value of the backoff count value in each timeslot greater than or equal to a quantity of idle channels, thereby accelerating a speed of decrementing the backoff count value to 0, shortening a backoff time in the channel selection process, and improving channel utilization.

The embodiments in this specification are all described in a progressive manner, for same or similar parts in the embodiments, reference may be made to these embodiments, and each embodiment focuses on a difference from other embodiments. The apparatus provided in the embodiments is described relatively simply because it corresponds to the method provided in the embodiments, and for portions related to those of the method, reference may be made to the description of the method.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Through the foregoing description of the implementation manners, it may be clearly understood by a person skilled in the art that the implementation manners in the present invention may be implemented by software in addition to necessary universal hardware, where the universal hardware includes a universal integrated circuit, a universal CPU, a universal memory, a universal device, and the like, and definitely may also be implemented by application-specific hardware, including an application-specific integrated circuit, an application-specific CPU, an application-specific memory, an application-specific device, and the like, but in many cases, the former one is a preferred implementation manner. Based on such understandings, the essence of the technical solutions in the present invention or the part that makes contributions to the prior art can be embodied in a software product. The computer software product may be stored in a readable storage medium including any medium that can store program code, such as a USB flash disk, a removable storage medium, a read-only memory (ROM, Read-Only Memory), a random access memory (RAM, Random Access Memory), a magnetic disk, or an optical disc, and includes several instructions for instructing a computer device (which may be a personal computer, a server, a network device, or the like) to perform the methods in the embodiments.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners, but are not intended to limit the protection scope. Any modification, equivalent replacement, and improvement made without departing from the principle shall fall within the protection scope.

What is claimed is:

1. A channel selection method comprising:
    ranking multiple channels, and generating a backoff count value;
    determining, for a timeslot, a decrement step that equals a quantity of idle channels in the timeslot divided by a quantity of channels required by a transmit end for sending data;
    sequentially decrementing the backoff count value according to a ranking sequence of the multiple channels and busy/idle states of all the multiple channels; and
    selecting, from the multiple channels according to a result of the decrement performed on the backoff count value and a busy/idle state of at least one of the multiple channels, a channel that is used by the transmit end for sending data.

2. The method according to claim 1, wherein sequentially decrementing the backoff count value comprises:
    for a channel among the multiple channels, when the channel is idle, subtracting a decrement step from a result of decrement performed according to a busy/idle state of a first channel, and using an obtained value as the backoff count value; or when the channel is busy, using a result of decrement performed according to a busy/idle state of the first channel as the backoff count value, wherein the decrement step is greater than or equal to 1, the first channel is a channel preceding the channel or a channel ranked first in the ranking sequence of the multiple channels.

3. The method according to claim 1, wherein selecting, from the multiple channels comprises:
    using a second channel whose backoff count value is 0 as a reference channel,
    a) determining m1 idle channels preceding the reference channel, the reference channel, and n1 idle channels following the reference channel as a channel candidate set according to the ranking sequence of the multiple channels, and
    b) selecting, from the channel candidate set, p channels as channels that are used by the transmit end for sending data, wherein the second channel follows the channel in the ranking sequence of the multiple channels, $m1>=0$, $n1>=0$, both m1 and n1 are integers, $m1+n1>=p-1$, and p is the quantity of channels required by the transmit end.

4. The method according to claim 1, wherein the generating a backoff count value comprises:
    randomly generating the backoff count value; or
    determining a value of a contention window according to system load and the quantity of channels required by the transmit end, and randomly generating the backoff count value within a value range of the contention window.

5. The method according to claim 1, wherein the method further comprises:
    determining a correspondence between one of the multiple channels and one of multiple associated channels, wherein
    a) when the multiple channels are physical channels, the multiple associated channels are logical channels; or
    b) when the multiple channel are logical channels, the multiple associated channels are physical channels.

6. The method according to claim 5, wherein determining the correspondence between the physical channel and the logical channel comprises:
    randomly determining a correspondence between a physical channel and a logical channel; or
    determining a correspondence between a physical channel and a logical channel according to frequencies of the physical channel and the logical channel, so that when physical channels are ranked according to frequencies, logical channels corresponding to the physical channels are also ranked according to a same frequency sequence; or numbering a physical channel and a logical channel according to a same frequency sequence, and determining a correspondence between a physical channel and a logical channel according to the following number relationship: logical channel number equals (physical channel number+offset random number) mod total quantity of physical channels.

7. A transmit end comprising a ranking unit, a generation unit, a decrement unit and a selection unit, wherein the ranking unit is configured to rank multiple channels; the generation unit is configured to generate a backoff count value;

the decrement unit is configured to
- a) determine, for a timeslot, a decrement step that equals a quantity of idle channels in the timeslot divided by a quantity of channels required by a transmit end for sending data, and
- b) sequentially decrement the backoff count value according to a sequence of ranking the multiple channels by the ranking unit and busy/idle states of all the multiple channels; and the selection unit is configured to select, from the multiple channels according to a result of the decrement performed by the decrement unit on the backoff count value and a busy/idle state of at least one of the multiple channels, a channel that is used by the transmit end for sending data.

8. The transmit end according to claim 7, wherein the decrement unit is further configured to:

for a channel among the multiple channels,
when the channel is idle,
- a) subtract a decrement step from a result of decrement performed according to a busy/idle state of a first channel, and
- b) use an obtained value as the backoff count value; or when the channel is busy,
- c) use a result of decrement performed according to a busy/idle state of the first channel as the backoff count value, wherein the decrement step is greater than or equal to 1, the first channel is a channel preceding the channel or a channel ranked first in the ranking sequence of the multiple channels.

9. The transmit end according to claim 7, wherein the selection unit is further configured to:

use a second channel whose backoff count value is 0 as a reference channel,
- a) determine m1 idle channels preceding the reference channel, the reference channel, and n1 idle channels following the reference channel as a channel candidate set according to the ranking sequence of the multiple channels, and
- b) select, from the channel candidate set, p channels as channels that are used by the transmit end for sending data, wherein the second channel follows the channel in the ranking sequence of the multiple channels, $m1 \geq 0$, $n1 \geq 0$, both m1 and n1 are integers, $m1+n1 \geq p-1$, and p is the quantity of channels required by the transmit end.

10. The transmit end according to claim 7, wherein the generation unit is further configured to:

randomly generate the backoff count value; or
determine a value of a contention window according to system load and the quantity of channels required by the transmit end, and randomly generate the backoff count value within a value range of the contention window.

11. The transmit end according to claim 7, further comprising:

a determining unit configured to determine a correspondence between one of the multiple channels and one of multiple associated channels, wherein
- a) when the multiple channels are physical channels, the multiple associated channels are logical channels; or
- b) when the multiple channels are logical channels, the multiple associated channels are physical channels.

12. The transmit end according to claim 11, wherein the determining unit is further configured to:

randomly determine a correspondence between a physical channel and a logical channel; or determine a correspondence between a physical channel and a logical channel according to frequencies of the physical channel and the logical channel, so that when physical channels are ranked according to frequencies, logical channels corresponding to the physical channels are also ranked according to a same frequency sequence; or number a physical channel and a logical channel according to a same frequency sequence, and determine a correspondence between a physical channel and a logical channel according to the following number relationship: logical channel number equals (physical channel number+offset random number) mod total quantity of physical channels.

13. A transmit end comprising:

a processor, a memory and a transceiver connected to each other by a bus;

the memory is configured to store instructions of a program for the processor to execute;

the processor executes the instructions so as to:
- a) rank multiple channels;
- b) generate a backoff count value;
- c) determine, for a timeslot, a decrement step that equals quantity of idle channels in the timeslot divided by a quantity of channels required by a transmit end for sending data;
- d) sequentially decrement, for the timeslot, the backoff count value by the decrement step according to a ranking sequence of the multiple channels and busy/idle states of the multiple channels; and
- e) select, from the multiple channels according to a result of the decrement performed on the backoff count value and a busy/idle state of at least one of the multiple channels, a channel that is used by a transmit end for sending data.

14. The transmit end according to claim 13, wherein the processor is further configured to:

for a channel among the multiple channels,
- a) when the channel is idle, subtract a decrement step from a result of decrement performed according to a busy/idle state of a first channel, and use an obtained value as the backoff count value; or
- b) when the channel is busy, use a result of decrement performed according to a busy/idle state of a first channel as the backoff count value, wherein the decrement step is greater than or equal to 1, the first channel is a channel preceding the channel or a channel ranked first in the ranking sequence of the multiple channels.

15. The transmit end according to claim 13, wherein the processor is further configured to:

use a second channel whose backoff count value is 0 as a reference channel,
- a) determining m1 idle channels preceding the reference channel, the reference channel, and n1 idle channels following the reference channel as a channel candidate set according to the ranking sequence of the multiple channels, and
- b) select, from the channel candidate set, p channels as channels that are used by the transmit end for sending data, wherein the second channel follows the channel in the ranking sequence of the multiple channels, $m1 \geq 0$, $n1 \geq 0$, both m1 and n1 are integers, $m1+n1 \geq p-1$, and p is the quantity of channels required by the transmit end.

16. The transmit end according to claim 13, wherein the processor is further configured to:

randomly generate the backoff count value; or determine a value of a contention window according to system load and the quantity of channels required by the transmit end, and randomly generate the backoff count value within a value range of the contention window.

* * * * *